United States Patent [19]

Chapuis et al.

[11] 4,214,711

[45] Jul. 29, 1980

[54] EROSION DEVICE COMPRISING A HEAD WITH KNIVES AND PROCESS

[75] Inventors: Maurice Chapuis, Sayat; Jean-Yves Machat, Clermont-Ferrand, both of France

[73] Assignee: Compagnie Generale des Etablissements Michelin, Clermont-Ferrand, France

[21] Appl. No.: 25,392

[22] Filed: Mar. 30, 1979

[30] Foreign Application Priority Data

Apr. 11, 1978 [FR] France .................. 78 10853

[51] Int. Cl.³ .............................................. B02C 7/12
[52] U.S. Cl. ..................... 241/30; 241/278 R; 414/317
[58] Field of Search ............. 241/83, 274, 277, 282, 241/296, 30, 278 R; 175/383, 391; 414/288, 317, 324

[56] References Cited

U.S. PATENT DOCUMENTS

| | | | |
|---|---|---|---|
| 1,182,541 | 5/1916 | Egge | 241/296 |
| 2,371,490 | 3/1945 | Williams | 175/391 |
| 2,504,978 | 4/1950 | Henning | 175/383 |
| 4,046,207 | 9/1977 | Taylor | 175/391 |

FOREIGN PATENT DOCUMENTS 779233  4/1935  France .

*Primary Examiner*—Donald L. Walton
*Attorney, Agent, or Firm*—Brumbaugh, Graves, Donohue & Raymond

[57] ABSTRACT

An erosion device comprising at least one head and means for imparting to the head movements of rotation around an axis and of translation along said axis is improved due to the fact that:

(a) the head comprises knives each having several teeth; on each knife two adjacent teeth are spaced apart from each other and leading edges of the teeth and their virtual extensions form a practically continuous line, called line of attack;

(b) the teeth being capable of digging grooves in a material to be eroded, the groove corresponding to each tooth having a portion in common with at least one groove corresponding to a tooth of an adjacent knife.

10 Claims, 9 Drawing Figures

EROSION DEVICE COMPRISING A HEAD WITH KNIVES AND PROCESS

The present invention relates to devices for eroding a material and the processes employed in these erosion devices.

French Patent No. 779,233 describes an apparatus for the metered feeding of tiny or pulverulent loose materials. This apparatus comprises scrapers rigidly connected with a movable central tube arranged in a tank filled with loose material, the tube carrying out movements of rotation around its axis and of descent along its axis.

Such a device is not adapted to the eroding of materials for the following reasons:

the erosion does not take place uniformly over the entire surface of the material;

there may occur a sliding of the scrapers in contact with the material without erosion or the formation of large eroded grains capable of clogging the evacuation conduits;

when the erosion produces particles which are entrained by a carrier liquid, this entrainment may be irregular, with the formation of piles of particles which it is difficult or even impossible to evacuate; and a film of eroded material is formed between the scrapers and the inner wall of the tank which interferes with the evacuation of the eroded material.

U.S. Pat. Nos. 4,046,207 and 2,504,978 and French published patent application No. 2,260,687 describe soil drilling bits. These bits are not suitable for the obtaining of particles which can be used in chemical and/or electrochemical generators.

The object of the invention is to avoid these drawbacks.

Accordingly, the erosion device in accordance with the invention, which comprises at least one head and means for imparting to the head movements of rotation around an axis and of translation along said axis, is characterized by the fact that:

(a) the head comprises knives each having several teeth; on each knife two adjacent teeth are spaced apart from each other and leading edges of the teeth and their virtual extensions form a practically continuous line, called line of attack;

(b) the teeth being capable of digging grooves in a material to be eroded; the groove corresponding to each tooth having a portion in common with at least one groove corresponding to a tooth of an adjacent knife.

The figures of the drawing—all of which are schematic—with their description as well as the examples which follow are intended to illustrate the invention and to facilitate an understanding thereof without, however, limiting its scope.

Figure 1:
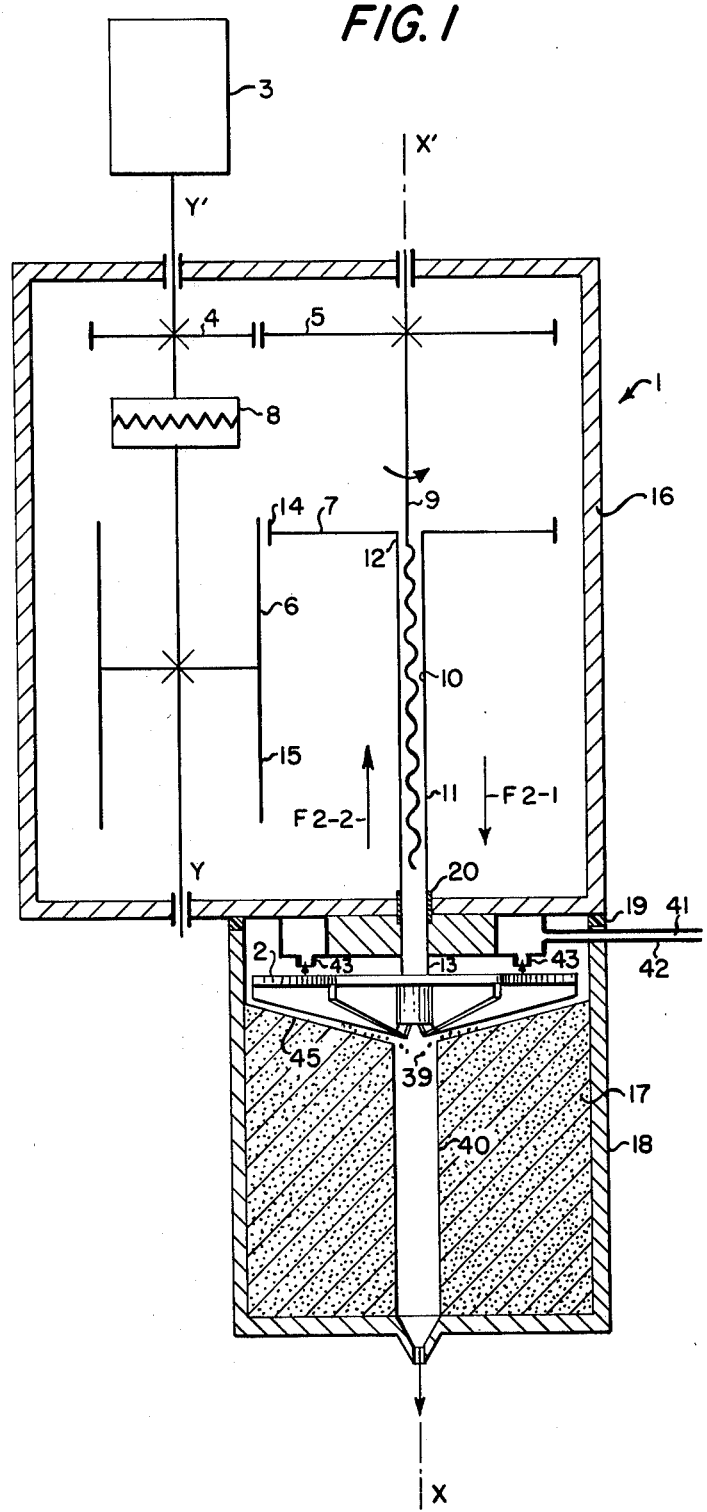
FIG. 1 shows, in cross section, an erosion device in accordance with the invention having a single head.
Figure 2:
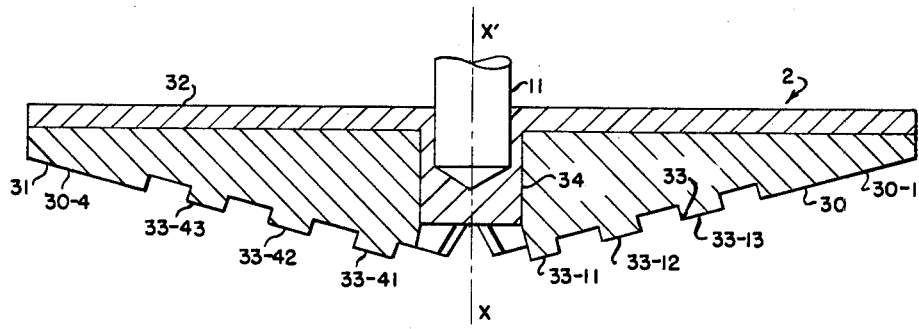
FIG 2 shows, in cross section taken on line II—II of FIG. 3, the head of the erosion device shown in FIG. 1.
Figure 3:
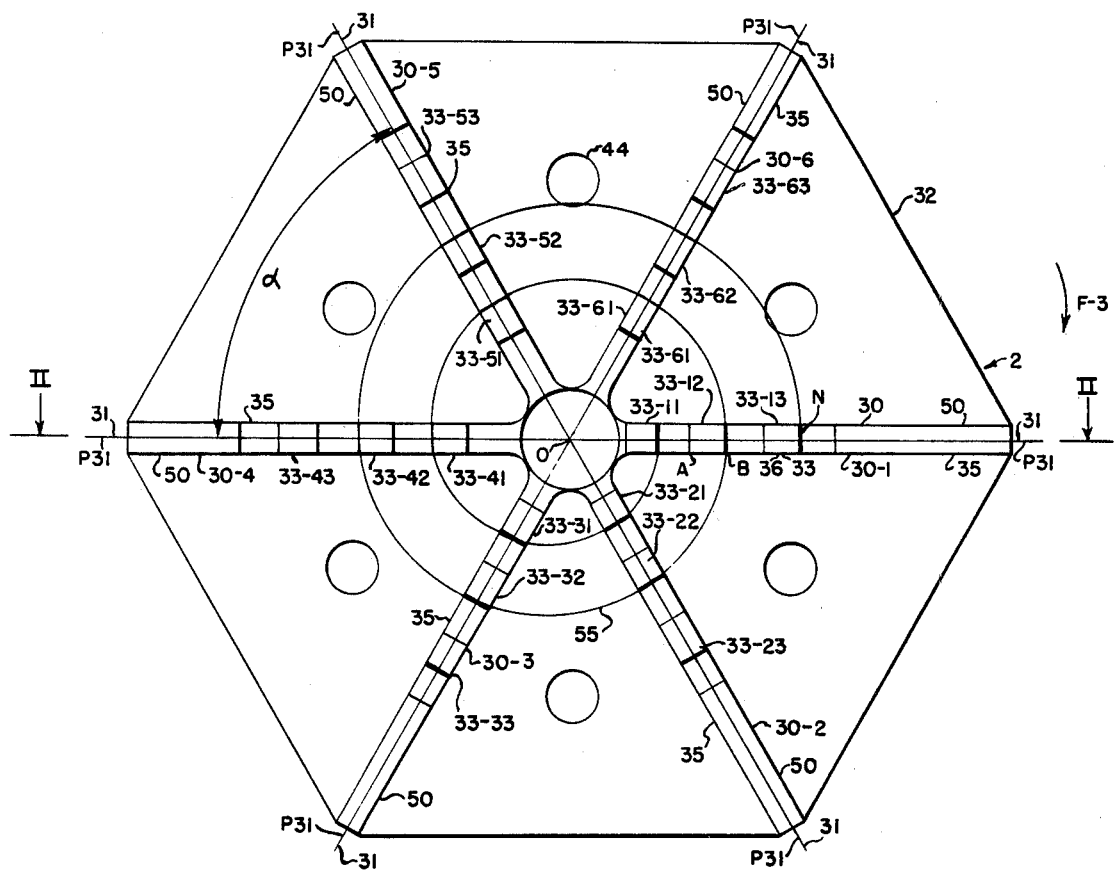
FIG. 3 shows, in bottom plan view, the head of the erosion device shown in FIG. 1.

FIG. 1 shows an erosion device 1 in accordance with the invention, this erosion device 1 comprising a head 2, shown in further detail in FIGS. 2 and 3. The motor 3 of this erosion device 1 drives two gearings in rotation, namely a gearing formed of a pair of gears 4, 5 and a gearing formed of a pair of gears 6, 7, the gear 6 being driven by the motor 3 via a clutch 8. The reduction ratios of these pairs of gears are slightly different. The gear 5 is rigidly connected with a worm 9 which screws into a nut 10 formed of the inner wall of a hollow rod 11 which is rigidly connected with the gear 7 at its end 12 and with the head 2 at its end 13. The axis of rotation XX' of the hollow rod 11 and of the worm 9 thus corresponds to the axis of rotation of the head 2. The speed of translation of the hollow rod 11 and therefore of the head 2 along the axis XX' is proportional to the difference in the angular velocities of rotation of the gears 5 and 7 and to the pitch of the system consisting of the worm 9 and nut 10, this translation being diagrammatically indicated by the arrow F 2-1 parallel to the axis XX'. This translation takes place during the rotation of the hollow rod 11 and therefore of the head 2, by a sliding of teeth 14 of the gear 7 along teeth 15 of the gear 6. The teeth 14 and 15 are parallel to the axis XX' which in its turn is parallel to the axis YY' of rotation of the gears 4 and 6. This entire kinematic mechanism of the erosion device 1 is housed in a watertight housing 16.

The movements of rotation and translation of the head 2 permit the eroding of a material 17 placed in a cylinder 18 which is tightly connected to the housing 16 by a toroidal gasket 19, a toroidal gasket 20 assuring tightness between the hollow rod 11 and the housing 16. When the erosion of the material 17 is finished, the translation F 2-1 of the head 2 is stopped due, for instance, to an end-of-stroke contact (not shown). The clutch 8 is then placed in disengaged position which causes the stopping of the gear 6 and therefore a rapid displacement of the head 2 along the axis XX' towards the gear 5, this displacement being diagrammatically indicated by the arrow F 2-2 pointing in a direction opposite that of the arrow F 2-1.

The axis XX' is vertical, the head 2 is fastened to the lower portion 13 of the hollow rod 11, and the material 17 is arranged below the head 2. It goes without saying that other arrangements are possible.

The head 2 has, for instance, six knives 30 (FIG. 3) designated 30-1 to 30-6, respectively, starting with the knife 30-1, and proceeding in the direction of rotation of the head 2 around the axis XX', this rotation being indicated diagrammatically by the arrow F-3 and the axis XX' being represented by the point 0. These knives 30 are blades of generally flat shape whose median planes 31 pass through the axis XX', every two successive median planes 31 forming with each other a constant angle α equal to 60°. These knives 30 are secured to a plate 32 whose periphery has, for instance, a generally flat shape perpendicular to the axis XX' and to the median planes 31 (FIGS. 2 and 3). The knives 30 and the plate 32 can, for instance, form a single mass machined from a metal block. It goes without saying that this arrangement is not limitative, and the head 2 may have more or less than six knives 30 and the knives 30 may be secured to the plate 32 for instance by means of nuts or cement.

Each knife 30-i, of rank "i", "i" varying for instance from 1 to 6, has teeth 33 each marked 33-ij, the order "j" of this tooth being equal to 1 for the tooth closest to the axis XX' and increasing successively by one unit upon moving away from the axis XX'. For simplification in the drawing only three teeth 33 are shown for each knife 30 in FIGS. 2 and 3. The knives 30 are arranged on the same side of the plate 32 which has a central boss 34 in which the hollow rod 11 is fastened. This hollow rod 11 can, for instance, be screwed into the boss 34, be cemented to said boss or form a machined block together with the plate 32.

Each knife 30 has an attack face 35 which faces the direction of rotation F-3 (FIG. 3).

Figure 4:
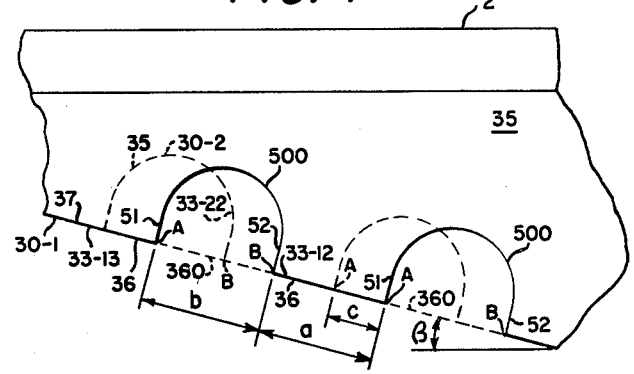
FIG. 4 shows, in profile view, two portions of two adjacent knives of the head shown in FIGS. 2 and 3, these knives being assumed to be superimposed.

FIG. 4 shows, for instance, a portion of the attack face 35 of the knife 30-1 with the two teeth 33-12 and 33-13. The leading edge 36 of each of these teeth, this leading edge 36 being on the attack face 35, causes the erosion of the material 17 upon the rotation of the head 2. The leading edges 36 of the knife 30-1 and their virtual extensions 360 form a practically continuous common line 37, called line of attack, which is a straight line segment in the example described, the virtual extensions 360 of the leading edges 36 being represented in dashed lines in FIG. 4.

The six attack faces 35 and the six lines of attack 37 of the knives 30 correspond to each other by rotation around the axis XX'.

The letter "a" represents the length of each leading edge 36, called attack edge, that is to say the length of each tooth 33.

For each tooth 33, the point A represents the point of the corresponding leading edge 36 which is closest to the axis XX' and the point B represents the point of said leading edge 36 which is furthest from the axis XX' (FIGS. 3 and 4). For clarity of the drawing, only the points A and B of the tooth 33-12 have been marked in FIG. 3.

The distance between the facing points A and B of the two adjacent teeth 33-12 and 33-13 is represented by the letter "b" measured along the line of attack 37, "b" thus representing the distance between two adjacent teeth 33, that is to say the spacing of these teeth 33.

The length "a" and the spacing "b" have, for the purpose of simplification, the same value for all knives, these values being for instance equal, but other embodiments are possible.

Figure 5:
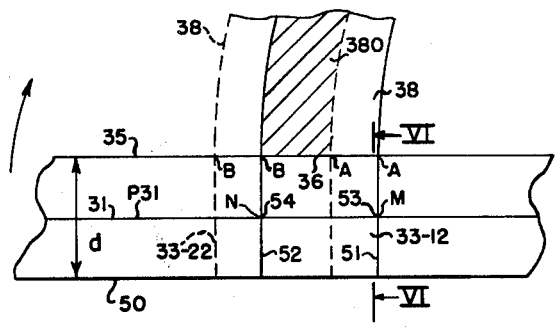
FIG. 5 shows, in bottom plan view, two portions of two adjacent knives of the head shown in FIGS. 2 and 3, these knives being assumed to be superimposed.

In FIG. 4 there is shown in dashed line the position of a portion of the attack face 35 of the knife 30-2 adjacent to the knive 30-1 when said attack face is superimposed on the attack face 35 of the knife 30-1, that is to say when it passes the same place as a result of the rotation F-3, the lines of attack 37 of these two attack faces 35 then merging. This dashed-line portion comprises the tooth 33-22 of the same order 2 as the tooth 33-12 of the knife 30-1. The positions of these teeth 33-12 and 33-22 are thus not identical, the points A of these two teeth being separated by the distance "c", this distance "c" being less than the length "a". The groove 38 produced by each of these teeth is practically limited by the circles produced by the points A and B of this tooth upon its rotation around the axis XX', as shown in FIG. 5. In this FIG. 5, the groove 38 corresponding to the tooth 33-22 is shown in dashed line, the grooves 38 being represented in part only in order to simplify the drawing.

The grooves 38 of the teeth 33-12 and 33-22 referred to above therefore have a common portion 380 which is limited by the circles produced by the rotation of the adjacent point A and point B of these teeth around the axis XX', this common portion 380 being hatched in FIG. 5. This common portion 380 favors the formation of particles 39 upon the erosion of the material 17, as shown in FIG. 1. The average diameter of these particles 39 is smaller the smaller the distance "c". One thus avoids the formation of irregular blocks or of chips which it is difficult to evacuate.

The arrangement described above is valid for any two teeth of the same order of two adjacent knives, except for the knives 30-1 and 30-6 for which each of the pairs of grooves have a common portion corresponds to two teeth whose orders differ by one unit.

In the head 2, the distance from the axis of the point A of each tooth of any order "j" increases progressively upon going from the knife 30-1 to the knife 30-6, the point A of the tooth 33-6j of the knife 30-6 being closer to this axis than the point A of the tooth 33-1 (j+1) of the knife 30-1. In view of increasing distance of the teeth from the axis, as previously described, it may happen that the knives do not all have the same number of teeth.

This arrangement has the effect of favoring the advancing of the particles 39 towards the axis XX' upon the rotation of the head 2, the evacuation of these particles 39 taking place through a channel 40, preferably of axis XX', passing through the mass 17. The entrainment of these particles 39 is favored by the use of an entrainment fluid 41, called carrier fluid, which is caused to arrive, for instance, via the conduit 42 into nozzles 43 arranged above the head 2. The flow of the carrier fluid 41, for instance, a liquid, towards the mass 17 is then facilitated by providing openings 44 through the plate 32 (FIGS. 1 and 3). In order further to facilitate the evacuation of the particles 39, the surface 45 of the material 17 in contact with the head 2 is imparted the shape of a conical frustum which widens in upward direction (FIG. 1).

This arrangement is not limitative and the head 2 can, for instance, be developed in such a manner that its rotation causes a displacement of the particles 39 towards the periphery, the distance from the axis XX' of the teeth of order "j" then gradually decreasing from the knife 30-1 to the knife 30-6.

It may then be advantageous to impart to the surface 45 of the material 17 the shape of a cone or of a conical frustum which widens towards the bottom.

When the number n of knives is any whatsoever, the preceding remarks are valid upon comparing the distances from the axis of the teeth of any order "j" from knife 30-1 to knife 30-n.

For each knife 30, the attack face 35 and the face 50 opposite said attack face 35, called trailing face, are flat and parallel to the median plane 31 located at an equal distance from these faces 35, 50. For each tooth 33, the transverse faces 51 and 52 are perpendicular to the median plane 31 of the corresponding knife 30, these transverse faces 51 and 52 passing respectively through the points A and B of said tooth 33 (FIG. 5). These transverse faces 51, 52 are for instance flat, perpendicular to the line of attack 37, and connected to the transverse faces 52, 51, respectively, of the adjacent teeth 33 by faces 500 of semicylindrical shape (FIG. 4).

The straight-line segments 53 and 54 corresponding, respectively, to the intersection of the median plane 31 with the transverse faces 51 and 52 therefore project parallel to the axis XX' on horizontal planes as points. FIG. 5 represents one such point M corresponding to the straight-line segment 53 and one such point N corresponding to the straight-line segment 54, these points M and N corresponding to the tooth 33-12, the median plane 31 being represented by its trace P 31 on the plane of FIG. 5. All the lines P 31 pass through the point 0, the intersection of the axis XX' with the horizontal plane onto which the projection is effected (FIG. 3). In horizontal projection, the points M are located on an Archimedes spiral, these points corresponding successively to the teeth 33-11 to 33-61, and then 33-12 to 33-62, and so on.

In fact, the radial distances in horizontal projection, that is to say with respect to the point 0, of two successive points M vary by a constant amount equal to $c \cdot \cos \beta$, $\beta$ being the angle, assumed constant, which each line of attack 37 makes with the horizontal plane (FIG. 4), this angle $\beta$ being called angle of the knives 30. The points N are also located in horizontal projection on another Archimedes spiral for the same reasons. FIG. 3 shows, for instance, a portion of the Archimedes spiral 55 corresponding to the points N. For clarity in the drawing, only the point N corresponding to the tooth 33-13 has been marked in FIG. 3.

Figure 6:
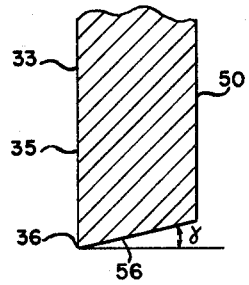
FIG. 6 shows, in cross section taken on line VI—VI of FIG. 5, a tooth of one of the knives shown in whole or in part in FIGS. 2 to 5.

In order to facilitate the erosion work, the lower face 56 of each tooth, that is to say the face facing the material 17, is inclined upward, starting from the leading edge 36, this lower face 56, which is for instance flat, forming in particular the angle $\gamma$ with any horizontal plane, as shown in FIG. 6. This angle $\gamma$ is preferably constant for all the teeth 33.

In accordance with U.S. Pat. No. 4,166,154, the erosion devices in accordance with the invention may be used to erode a substantially compact feed mass so as to introduce particles into at least one liquid, called reactor liquid, used in at least one chemical and/or electrochemical reactor. This compact feed mass contains particles, called primary particles, and a small amount of at least one liquid, called compacting liquid, which is only slightly if at all chemically reactive with the primary particles. The erosion device 1 then makes it possible to dissociate this compact feed mass into particles, called secondary particles, which are entrained in the reactor liquid by means of at least one carrier liquid. The primary and secondary particles may have the same size unless the secondary particles are formed by fragmentation or agglomeration of the paimary particles. The compacting liquid, the carrier liquid and the reactor liquid may be identical or different in their composition.

Figure 7:
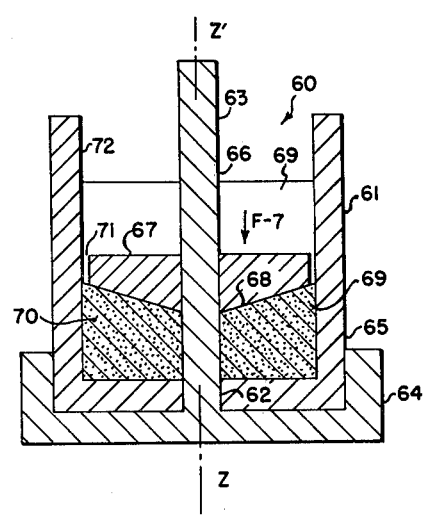
FIGS. 7 and 8 show, in cross section, a compacting device which makes it possible to obtain a compact mass of material to be eroded.

This compact feed mass is obtained, for instance, in a device 60 shown in FIG. 7. This device 60, called compacting device, comprises a cylinder of revolution 61, called compacting cylinder, which is provided at its lower part with an opening 62 into which a removable part 63 is introduced. This removable part 63 has a base 64 into which a lower portion 65 of the cylinder 61 is introduced and a vertical cylindrical rod 66 arranged in the axis ZZ' of the cylinder 61. A piston 67 slides along the rod 66.

A lower portion 68 of the piston 67 forms a conical frustum in relief which widens towards the top. A compacting liquid 69 and primary particles 70 are poured into the cylinder 61. The displacement of the piston 67 in downward direction as indicated by an arrow F-7 compacts the primary particles 70, eliminating from these particles the greatest portion of the compacting liquid 69 which collects above the piston 67 due to a clearance 71 provided between the piston 67 and an inner wall 72 of the cylinder 61. This clearance 71, which has been considerably enlarged in FIG. 7 for clarity of the drawing, is less than the average diameter of the primary particles 70.

The compacting liquid 69, practically free of primary particles 70, which is located above the piston 67 is evacuated and the piston 67 and the removable part 63 are taken away.

Figure 8:
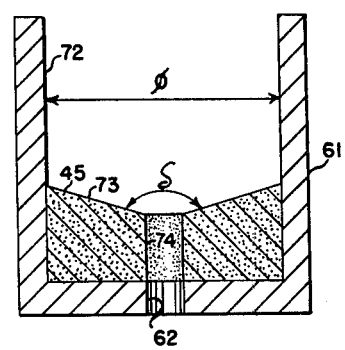

The cylinder 61 then remains, within which there is contained a compacted mass 73, called compact feed mass, containing a small amount of compacting liquid 69 and having in its central portion a cylindrical opening 74 which corresponds to the position previously occupied by the rod 66, this opening 74 communicating with the opening 62 of the cylinder 61 (FIG. 8).

The upper face 45 of this compact feed mass 73 has the shape of a conical frustum whose angle $\delta$ is directed upward, this conical frustum corresponding to the impression of the piston 67 in the compact feed mass 73. The angles $\beta$ and $\delta$ are preferably related by the equation $2\beta = 180° - \delta$, $\beta$ being the angle of the knives 30 which has been previously defined and shown in FIG. 4.

The compact feed mass 73 may be stored for a long period of time either in the cylinder 61 or after removal from this cylinder 61, since it generally retains its shape after compacting. The compact feed mass 73 can be eroded, for instance, by the erosion device 1 shown in FIG. 1; it then occupies the place of the material 17, the compacting cylinder 61 being arranged in the place of the cylinder 18 and the secondary particles being formed of the particles 39, the discharge of the carrier liquid 41 and of the particles 39 taking place through the opening 74 which serves as channel 40.

Figure 9:
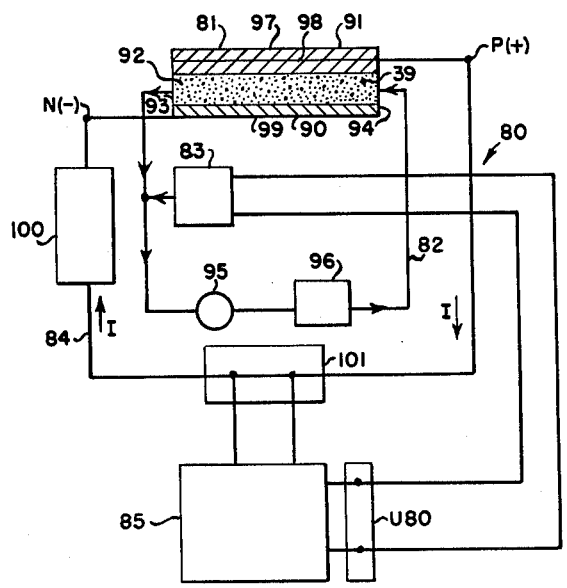
FIG. 9 is a diagram showing the use of an erosion device in accordance with the invention for supplying an electrochemical generator of electric current.

FIG. 9 shows a diagram 80 for the use of an erosion device in accordance with the invention. This diagram 80 comprises an electrochemical generator 81 for electric current, a path 82 permitting recirculation of liquid and particles in the generator 81, an erosion device 83 in accordance with the invention discharging into the path 82, an electric discharge circuit 84, and a device 85 which makes it possible to regulate the operation of the erosion device 83 as a function of the electric current passing through the discharge circuit 84.

The generator 81 comprises at least two compartments 90 and 91 of opposite sign. At least one of these compartments, for instance compartment 90, is traversed by a stream of an electrolyte 92 which acts as reactor liquid, this electrolyte 92 containing particles which are the particles 39 previously described. These particles 39 react electrochemically in the compartment 90. The outlet 93 and the inlet 94 of the compartment 90 are connected by the path 82 which permits the recirculation in compartment 90 of the electrolyte 92 and the particles 39, with the exception of those which may have been entirely consumed during their passage in the compartment 90. This path 82 comprises a pump 95 and a buffer reservoir 96 of electrolyte 92 and particles 39. By way of example, the compartment 90 is an anode compartment, the particles 39 being formed, at least in part, of an anodic active metal, in particular zinc; the electrolyte 92 is an alkaline aqueous electrolyte; the compartment 91 has a cathode 97, for instance an air or oxygen diffusion cathode or a cathode with at least one metallic oxide. The erosion device 83 is for instance the erosion device 1 shown in FIG. 1, the material 17 consisting of the compact feed mess 73 shown in FIGS. 7 and 8. This generator 81 is, for instance, one of the generators described in U.S. Pat. Nos. 4,092,461; 4,101,717; 4,133,940; 4,136,232; and 4,166,885.

The collector 98 of the cathode 97 is connected to the positive terminal P(+) and the anode collector 99 is connected to the negative terminal N(−). The electrical discharge circuit 84 connected to the terminals P(+) and N(−) of the generator 81 contains an impedance 100, for instance an electric motor, and a shunt 101 which makes it possible to tap off a small part of the discharge current into the regulating device 85. The discharge current passing through the circuit 84 and therefore into the impedance 100 has a current intensity I.

The operating conditions, which are in no way limitative, may be as follows:

electrolyte 92 (reactor liquid): 4 to 12 N aqueous potassium hydroxide solution (4 to 12 mols of potassium hydroxide per liter);

compacting liquid 69 and carrier liquid 41: initial composition identical to that which the electrolyte has at the start of the discharge, namely 4 to 12 N aqueous potassium hydroxide solution, practically not zincated;

primary particles 70: zinc particles the average size of which, before introduction into the compacting liquid 69, ranges from 10 to 20 microns (micrometers); these particles have a tendency to agglomerate in the potassium hydroxide solution to give larger particles whose average diameter varies from 50 to 500 microns (micrometers), this average diameter corresponding practically to that of the primary particles 70 and of the secondary particles 39;

the compact feed mass 73 has a density varying approximately from 3 to 4 kg/dm$^3$; the ratio M=mass of compacting liquid/mass of zinc in the compact feed mass 73 varies in practice from 0.18 to 0.55; the ratio V=volume of the compacting liquid/volume of zinc in the compact feed mass 73 varies in practice from 1.10 to 2.67, the measurements being effected at about 25° C.; for example, when the compacting liquid is 6 N aqueous potassium hydroxide solution, the ratios M and V are practically equal to 0.42 and 2.35, respectively, for a density of 3, and they are practically equal to 0.20 and 1.13, respectively, for a density of 4;

percentage by weight of zinc in the electrolyte introduced into the anode compartment 90: 20% to 30% of the weight of the electrolyte;

characteristics of the head 2: number of teeth of the knife 30-1=27; number of teeth of the other knives=26; length "a" of the leading edges 36=from 1 to 5 mm, for instance, substantially 1.5 mm; spacing "b" of two adjacent teeth=value practically equal to the length "a"; distance "c" included approximately between 1/5 and ½ of the length "a", i.e., for instance about 0.5 mm when the length "a" is equal to 1.5 mm; diameter $\phi$ of the inner cylinder 72 (FIG. 8)=from 100 to 300 mm, for instance practically equal to 200 mm; thickness "d" of the knives (FIG. 5)=from $\phi/200$ to $\phi/50$, for example on the order of 2 mm when the diameter $\phi$ is equal to 200 mm; angle $\beta$=from 10° to 30°, for instance about 15° when $\phi$ is equal to 200 mm; angle $\gamma$=from 5° to 30°, for instance close to 10°; speed of rotation=12 to 120 rpm; speed of translation during the erosion in the direction of the arrow F 2-1=from 0.12 to 1.2 mm/minute; rate of flow of the carrier liquid=from 10 to 20 cc/minute/cm$^2$ of inner cross section of the cylinder 61;

current intensity I passing through the discharge circuit 84: from 5A to 50A under a voltage of close to 1 volt, which corresponds to a consumption of zinc varying from 0.108 to 1.08 g/minute.

During the discharge the concentration of oxidized zinc dissolved in the form of potassium zincate in the electrolyte is maintained below a predetermined value, equal for instance to 120 g/liter approximately when the electrolyte is 6 N potassium hydroxide solution, so that the secondary particles 39 are not made inactive by an accumulation of the reaction product on their surface or in the vicinity of their surface.

The erosion process in accordance with the invention thus makes it possible to maintain within precise limits the percentage by weight of zinc particles in the electrolyte, which limits may be very narrow, for instance ±1% of the average concentration selected. The expenditure of energy for the erosion of the compact feed mass 73 is slight, for instance less than one hundredth of the energy supplied by the generator 81.

The regulating device 85 is one of the devices described in the aforementioned U.S. Pat. No. 4,166,154. It makes it possible to obtain a current voltage U80 which feeds the erosion device 83.

This voltage U80 makes it possible to control the operation of the generator 81 either in accordance with the discharge current intensity I or with the amount of electricity discharged by the generator 81 into the circuit 84.

In the event that the control is effected as a function of the current intensity I, the voltage U80 varies as a function of this current intensity, for instance proportionally to it, and it feeds the motor 3, the speeds of rotation and translation of the head 2 being then proportional to this current intensity I. It may be advantageous to provide another motor which permits the rotation of the worm 9, as described in the aforementioned U.S. Pat. No. 4,166,154. This motor (not shown in FIG. 1) is then fed by the voltage U80, the motor 3 being in this case fed by another invariable source of current (not shown in FIG. 1). The head 2 is thus subjected during the erosion to a constant speed of rotation, the speed of translation varying as a function of the current intensity I, for instance proportionally thereto.

In the event that the control is effected as a function of the quantity of electricity, the constant voltage U80 is available only for constant times, the head 2 is then imparted constant speeds of rotation and of translation during constant times Ta, called feed times, the period separating two successive feeds varying as a function of the current intensity I.

The other arrangements described in the aforementioned U.S. Pat. No. 4,166,154 can be applied to the erosion process in accordance with the invention. Thus, for instance, one can contemplate the erosion of several compact feed masses arranged in the same cylinder, the erosion as well as the introduction of the carrier liquid, can take place from the bottom to the top, and the carrier liquid can be introduced into the hollow rod 11 through the head 2.

Of course, the invention is not limited to the embodiments which have been described above, on basis of which one can contemplate other methods and embodiments without thereby going beyond the scope of the invention.

What is claimed is:

1. An erosion device comprising at least one head and means for imparting to the head movements of rotation around an axis XX' and of translation along said axis, characterized by the fact that
   (a) the head comprises knives which are blades of generally flat shape, each knife having an attack face, a trailing face and a median plane;
   (b) the median plane of each knife, located at an equal distance from the attack face and the trailing face of this knife, passes through the axis XX', every two successive median planes forming with each other a constant angle $\alpha$;
   (c) each knife has several teeth; each tooth has a leading edge with a length "a", said leading edge being on the attack face of the knife; the leading edges of the teeth of the knife and their virtual extensions form a practically continuous common line, called line of attack; two adjacent teeth of the knife are separated by a spacing "b"; the length "a" and the spacing "b" being measured along the line of attack; and
   (d) the teeth are capable of digging grooves in a material to be eroded, the groove corresponding to each tooth having a portion in common with at least one groove corresponding to a tooth of an adjacent knife.

2. The device according to claim 1, characterized by the fact that the length "a" of the teeth and the spacing "b" of the adjacent teeth of the same knife are constant.

3. The device according to claim 1 or claim 2, characterized by the fact that the two teeth of two adjacent knives capable of digging grooves having a common portion are separated by a constant distance "c" measured along the same line of attack by superimposing the corresponding knives.

4. The device according to claim 1, characterized by the fact that the distance from the axis of teeth of the same order varies in the same direction upon passing from one knife to the following knife, in the direction of rotation, from the knife of rank 1 to the knife of rank n, n being the total number of knives of the head.

5. The device according to claim 4, characterized by the fact that said distance increases.

6. The device according to claim 1, characterized by the fact that the line of attack is linear.

7. The device according to claim 6, characterized by the fact that the line of attack forms with the plane perpendicular to the axis a constant angle $\beta$ varying from 10° to 30°.

8. The device according to claim 1, characterized by the fact that the lines of intersection of the median plane with transverse faces of the teeth project parallel to the axis onto a plane perpendicular to said axis as points arranged on Archimedes spirals.

9. The device according to claim 1, characterized by the fact that the face of each tooth located between the attack face and the trailing face of the corresponding knife and limited by the leading edge of the tooth forms a constant angle $\gamma$ with a plane perpendicular to the axis, this angle $\gamma$ varying from 5° to 30°.

10. A process for eroding of a material by causing rotation of at least one head around an axis XX' as well as translation of the head along said axis, characterized by the fact that
   (a) the head comprises knives which are blades of generally flat shape, each knife having an attack face, a trailing face and a median plane;
   (b) the median plane of each knife, located at an equal distance from the attack face and the trailing face of this knife, passes through the axis XX', every two successive median planes forming with each other a constant angle $\alpha$;
   (c) each knife has several teeth; each tooth has a leading edge with a length "a", said leading edge being on the attack face of the knife; the leading edges of the teeth of the knife and their virtual extensions form a practically continuous common line, called line of attack; two adjacent teeth of the knife are separated by a spacing "b"; the length "a" and the spacing "b" being measured along the line of attack; and
   (d) the teeth are capable of digging grooves in a material to be eroded, the groove corresponding to each tooth having a portion in common with at least one groove corresponding to a tooth of an adjacent knife.

* * * * *